UNITED STATES PATENT OFFICE 2,594,268

PROCESS OF PURIFYING GASEOUS CARBON DIOXIDE

Wilhelm Geisel, Ludwigshafen-on-the-Rhine, Germany

No Drawing. Application October 1, 1949, Serial No. 119,213. In France November 15, 1946

6 Claims. (Cl. 23—150)

This invention relates to a process of purifying gaseous carbon dioxide. More specifically it relates to the removal from carbon dioxide gas of organic sulfur compounds, in particular carbon oxysulfide.

According to a known process, water-gas may be freed from organic sulfur compounds, such as carbon oxysulfide, carbon disulfide and thiophene, by passing the gas along with ammonia gas and oxygen or air over active carbon. The particular active carbon used in this process may be prepared from mineral coal according to the method described in U. S. Patent No. 1,582,718. This method consists in depositing pieces or grains of the said coal upon a layer of refractory material and treating the coal with hot activating gases which are blown through with sufficient pressure to establish a strong agitation of the coal. The process of purifying water gas with the aid of this coal, however, is not applicable to the purification of carbon dioxide because the ammonia added would unfavorably interfere with the further processing of the carbon dioxide, especially if the carbon dioxide is to be liquefied, as the ammonia would in this case detrimentally affect the compression of the gas.

I have now found that gaseous carbon dioxide may also be substantially freed from organic sulfur compounds, in particular of carbon oxysulfide, even in the absence of ammonia by means of an active carbon of the type hereinbefore defined, by treating the gas in the presence of oxygen with the said active carbon under pressure, preferably at a pressure ranging from 100 to 200 atmospheres. Strong heating is not necessary, but care should be taken that the temperature does not fall below the critical temperature of carbon dioxide. The purification mechanism may be illustrated in the case of carbon oxysulfide by the equation: $COS + O = S + CO_2$. The sulfur formed is obtained as a deposit on the active carbon. By this method, for example, a carbon dioxide gas containing 80 mg. of oranic sulfur compounds per each cubic meter may be purified to the extent of containing no more than a few milligrams per cubic meter.

If this residual amount of organic sulfur, too, is to be removed from the carbon dioxide gas, the latter, while still under pressure, may be passed at elevated temperature over masses, capable of combining with sulfur, preferably masses which contain copper and nickel. The reaction taking place on the surface of these masses probably proceeds according to the following equation: $COS + H_2O = H_2S + CO_2$. The hydrogen sulfide formed is retained by the purification mass in the form of metal sulfides. Generally speaking it is not necessary to add steam to the carbon dioxide as the ordinary moisture content thereof will be sufficient for the purpose of the reaction.

The following example serves to illustrate the nature of my invention, without, however, restricting it thereto.

*Example*

Through a high pressure tube of 1 cubic meter capacity charged with about 500 kilograms of active carbon of the type obtained according to U. S. Patent No. 1,582,718, there is passed, at 40° C., under a pressure of 150 atmospheres, a gas containing 98.5 per cent of carbon dioxide and, in addition, some nitrogen and hydrogen, as well as organic sulfur compounds and oxygen. The gas is passed through at a rate of 2700 kilograms per hour. This corresponds to a total throughput of 120 grams of organic sulfur compounds and 1600 grams of oxygen. The gas leaving the tube contains only 6 grams per hour of organic sulfur compounds. Similar results are achieved with an hourly throughput of only 1350 kilograms of gas or of 2700 kilograms of a gas, the sulfur content of which corresponds to 60 grams per hour.

The gas leaving the tube is heated to 220° C. and then passed through a second high pressure tube of the same capacity charged with 500 kilograms of a catalyst prepared in the following manner: 2000 liters of pumice stone are sprayed over with a solution of 100 kilograms of nickel and 10 kilograms of copper in 700 kilograms of 40 per cent nitric acid, heated to 300° C. in a current of hot air and screened to remove dusty particles. The gas leaving the tube is entirely free of organic sulfur compounds.

I claim:

1. In a process of purifying substantially pure gaseous carbon dioxide containing a minor amount of carbon oxysulfide as a contaminant, the step which comprises passing said contaminated carbon dioxide together with enough oxygen, under non-alkaline conditions, to decompose the carbon oxysulfide into carbon dioxide and free sulfur, under increased pressure ranging over 100 atmospheres and at a temperature not below the critical temperature of carbon dioxide, through a bed of activated carbon, said activated carbon having been prepared by treating mineral coal in a shaft furnace with hot combustion gases which are blown through the coal with sufficient pressure to establish a strong agitation of the coal, until the amount of the carbon oxysulfide is substantially entirely reduced.

2. In a process of purifying substantially pure gaseous carbon dioxide containing a minor amount of carbon oxysulfide as a contaminant the step which comprises passing said contaminated carbon dioxide together with enough oxygen, under non-alkaline conditions, to decompose the carbon oxysulfide into carbon dioxide and free sulfur, under a pressure ranging from 100 to 200 atmospheres and at a temperature not below the critical temperature of carbon dioxide, through a bed of activated carbon, said activated carbon having been prepared by treating mineral coal in a shaft furnace with hot combustion gases which are blown through the coal with sufficient pressure to establish a strong agitation of the coal, until the amount of the carbon oxysulfide is substantially entirely reduced.

3. Method of purifying substantially pure gaseous carbon dioxide containing a minor amount of carbon oxysulfide as a contaminant which comprises passing said contaminated carbon dioxide together with enough oxygen, under non-alkaline conditions, to decompose the carbon oxysulfide into carbon dioxide and free sulfur, under a pressure ranging over 100 atmospheres and at a temperature not below the critical temperature of the carbon dioxide, through a bed of activated carbon, said activated carbon having been prepared by treating mineral coal in a shaft furnace with hot combustion gases which are blown through the coal with sufficient pressure to establish a strong agitation of the coal until the amount of the carbon oxysulfide is substantially entirely reduced and then removing the last traces of the carbon oxysulfide therefrom by passing the substantially desulfurized gaseous carbon dioxide, under the aforesaid high pressure, in the presence of moisture over masses which contain copper and nickel maintained at an elevated temperature, said masses being capable of removing the last traces of the sulfur at an elevated temperature.

4. Method of purifying substantially pure gaseous carbon dioxide containing a minor amount of carbon oxysulfide as a contaminant which comprises passing said contaminated carbon dioxide together with enough oxygen, under non-alkaline conditions, to decompose the carbon oxysulfide into carbon dioxide and from sulfur, under a pressure ranging over 100 atmospheres and at a temperature not below the critical temperature of the carbon dioxide, through a bed of activated carbon, said activated carbon, having been prepared by treating mineral coal in a shaft furnace with hot combustion gases which are blown through the coal with sufficient pressure to establish a strong agitation of the coal, until the amount of the carbon oxysulfide is substantially entirely reduced, and then removing the last traces of the carbon oxysulfide therefrom by passing the substantially desulfurized gas, under the aforesaid high pressure in the presence of moisture, at a temperature of 220° C. over masses which contain copper and nickel, said masses being capable of removing the last traces of the sulfur at an elevated temperature.

5. Method of purifying substantially pure gaseous carbon dioxide containing a minor amount of carbon oxysulfide as a contaminant which comprises passing said contaminated carbon dioxide together with enough oxygen, under non-alkaline conditions, to decompose the carbon oxysulfide into carbon dioxide and free sulfur, under a pressure ranging from 100 to 200 atmospheres and at a temperature not below the critical temperature of carbon dioxide, through a bed of activated carbon, said activated carbon having been prepared by treating mineral coal in a shaft furnace with hot combustion gases which are blown through the coal with sufficient pressure to establish a strong agitation of the coal, until the amount of the carbon oxysulfide is substantially entirely reduced, and then passing the substantially desulfurized gas, while still under the aforesaid high pressure, in the presence of moisture over masses which contain copper and nickel at an elevated temperature of about 220° C., said masses being capable of removing the last traces of the sulfur at an elevated temperature.

6. Method of purifying substantially pure gaseous carbon dioxide containing a minor amount of carbon oxysulfide as a contaminant which comprises passing said contaminated carbon dioxide together with enough oxygen, under non-alkaline conditions, to decompose the carbon oxysulfide into carbon dioxide and free sulfur, under a pressure of 150 atmospheres and at a temperature of about 40° C., through a bed of activated carbon, said activated carbon having been prepared by treating mineral coal in a shaft furnace with hot combustion gases which are blown through the coal with sufficient pressure to establish a strong agitation of the coal, until the amount of the contaminated carbon oxysulfide is substantially entirely reduced, and then passing the substantially desulfurized gas, under the aforesaid pressure, in the presence of moisture over masses which contain copper and nickel at a temperature of about 220° C., said masses being capable of removing the last traces of the sulfur at an elevated temperature.

WILHELM GEISEL.

REFERENCES CITED

The following references are of record in the file of this patent:

UNITED STATES PATENTS

| Number | Name | Date |
|---|---|---|
| 1,582,718 | Winkler | Apr. 27, 1926 |
| 1,895,724 | Miller | Jan. 21, 1933 |
| 1,900,751 | Baehr | Mar. 7, 1933 |
| 1,945,407 | Adair et al. | Jan. 30, 1934 |
| 1,968,899 | Nathan | Aug. 7, 1934 |
| 2,037,685 | Holden | Apr. 14, 1936 |
| 2,074,311 | Moore | Mar. 16, 1937 |
| 2,110,240 | Roelen | Mar. 8, 1938 |
| 2,149,039 | Benning | Feb. 28, 1939 |
| 2,168,933 | Giller | Aug. 8, 1939 |

OTHER REFERENCES

"Handbook of Chem. and Physics," pp. 364–365, 28th ed., by C. D. Hodgman. Chemical Rubber Publishing Co., Cleveland, Ohio.

J. W. Mellor's "Inorganic and Theoretical Chemistry," vol. 1, page 231, and vol. 5, pp. 973, 975, 976. Longmans, Green & Co., N. Y.

"Textbook of Physical Chemistry," page 1173, by S. Glasstone, sixth printing. D. Van Nostrand Co., Inc., N. Y.

"Hackh's Chemical Dictionary," 1944 ed., page 168. P. Blakiston Co., Philadelphia.

"Gas Manufacture," by Davidson, 1923 ed., page 259, Longmans, Green & Co., N. Y.

"Fuels and Their Combustion," by Haslam and Russell, pp. 162–164; and 602; 1926 ed. McGraw-Hill Book Co., N. Y.

"Inorganic Chemistry," by Ephraim, pp. 846, 847; 1943 ed. Nordeman Publishing Co., N. Y.